United States Patent
Chang et al.

(10) Patent No.: US 7,257,260 B2
(45) Date of Patent: Aug. 14, 2007

(54) METHOD AND A DEVICE FOR PROCESSING DIGITAL IMAGE

(75) Inventors: King-Hsiung Chang, Hsinchu (TW); Hui-Huang Chang, Hsinchu (TW); Hsin-Ying Ou, KaoHsiung (TW); Chien-Hua Hsieh, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 903 days.

(21) Appl. No.: 10/442,071

(22) Filed: May 21, 2003

(65) Prior Publication Data

US 2003/0219071 A1 Nov. 27, 2003

(30) Foreign Application Priority Data

May 23, 2002 (TW) .............................. 91111154 A

(51) Int. Cl.
*G06K 9/36* (2006.01)
(52) U.S. Cl. ...................................................... 382/232
(58) Field of Classification Search ................ 382/232, 382/233, 236
See application file for complete search history.

(56) References Cited

U.S. PATENT DOCUMENTS

| | | | |
|---|---|---|---|
| RE36,145 E * | 3/1999 | DeAguiar et al. .......... 345/538 |
| 6,195,513 B1 * | 2/2001 | Nihei et al. ................. 396/332 |
| 6,625,316 B1 * | 9/2003 | Maeda ........................ 382/203 |
| 2002/0186412 A1 * | 12/2002 | Murashita ................... 358/1.16 |

\* cited by examiner

*Primary Examiner*—Vikkram Bali
(74) *Attorney, Agent, or Firm*—Winston Hsu

(57) ABSTRACT

A method and a device for processing digital image are provided. The processing method comprises a coding process and a decoding process. The coding process comprises the steps of: obtaining the background data of an image data; separating the foreground data from the image data according to the background data; generating a file header; coding and compressing the foreground data as data packets according to a compression type; and generating a coded image file by combining the file header and the data packets. Each packet contains the information about the foreground data, packet size and location of the foreground data. The file header contains the information about the background data, images width, image height, image type, coding type, and compression type. The decoding process comprises the steps of reading the coded image file; obtaining the file header from the image data; decompressing each compressed foreground data of the data packet according to the compression type to generate the foreground data; forming the original image data by writing the foreground data into the locations stored in the data packet and writing the background data into the background location which are not filled with the foreground data.

12 Claims, 5 Drawing Sheets

METHOD AND A DEVICE FOR PROCESSING DIGITAL IMAGE

BACKGROUND OF THE INVENTION (a). Field of the Invention

The present invention relates to a method and a device for processing digital image, more particularly, to a method and a device that will separate the image's foreground data from its background data before coding the image into a coded image file.

(b). Description of the Prior Arts

Conventionally, because the amount of data of a digital image file is huge, large bandwidth and high performance are needed for a processing device when handling these image data without compression. The common technologies used for compressing the digital image data include GIF, JPG. PIC and so forth. Some of the technologies may reduce the resolution of the image data, others don't. Usually, the compression ratio of the image data with reduced resolution is much higher than that without any reduction. Nevertheless, no matter if the resolution is reduced or not, all of these conventional compressing technologies always compress the whole image data in one shot. No pre-handling process is performed on the image data before starting the compressing process. Therefore, the compression ratio will be limited in order to obtain a compressed image file without reducing the resolution. However, in real practice, the foreground data of a regular image may only be in a certain portion of the whole image, for example, may only be 20% of it, and the rest is the background data. Therefore, if the foreground data and the background data can be separated in advance before performing the compressing process of the image data, the size of the compressed image file will be extremely and efficiently reduced.

In addition, due to the limitation of sensitivity and the characteristic of Analog-to-Digital Converter (ADC), sometimes an image sensor may still output an uneven result of scan even when the image being scanned is merely a background image with only one color. The quality of the scanned image is seriously impacted.

SUMMARY OF THE INVENTION

The primary object of the present invention is to provide a method and a device for processing a digital image, which will separate the image's foreground data from its background data before coding the image into a coded image file so as to reduce the amount of the image data.

Another object of the present invention is to provide a method and a device that will separate the image's foreground data from its background data before coding the image into a coded image file. The background data is only contained in the header of the coded image file. When decoding the coded image file, the background of the decoded image is generated by using the background data contained in the header of the coded image file. Therefore the background of the decoded image will be with the same color evenly. The amount of data of the coded image file is also reduced.

Yet another object of the present invention is to provide a method and a device for transforming the background data of the image data. By separating the foreground data from the background data in advance before coding the image data, the background data can be replaced easily with another predetermined background data so as to obtain a new image data with different background data.

In order to achieve the foregoing object, the digital image processing method of the present invention provides a coding method. The coding method comprises the steps of: obtaining a background data of the image data; separating the foreground data from the image data according to the background data; generating a file header; coding and compressing the foreground data as data packets according to a compression type; and generating a coded image file by combing the file header and the packets. Each packet includes the information about the foreground data, packet size and foreground data location. The file header includes the information about the background data, image width, image height, image type, coding type, and compression type.

In order to achieve the foregoing object, the digital image processing method of the present invention also provides a decoding method. The decoding method comprises the steps of: reading a coded image file; obtaining the file header from the coded image file; decompressing each packet according to the compression type contained in the file header to generate the foreground data; forming the original image data by allocating the foreground data into its corresponding location stored in the data packet. Locations which are not filled with the foreground data will be filled with the background data.

Additionally, The digital image processing device of the present invention comprises: a parameter setting unit for setting up the background data, an image data separating unit for separating the foreground data that is not belong to the background data from the original digital image data file to generate the foreground data, a foreground data storing unit for storing the foreground data, a data format generating unit for generating an image file header, and the file header comprises the information of the background data.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PRESENT INVENTION

The following embodiments will illustrate the device and the method for processing the digital image of the present invention in detail.

The concept of the device and the method for processing the digital image of the present invention is to separate the foreground data from the background data in advance before performing the coding process of an image data. The extracted foreground data is then coded, and the information of the background data is added to the file header which is further combined with the coded foreground data so as to generate the coded image file. In general, the amount of the foreground data is much less than that of the whole image data, therefore, the total amount of data that need to be processed is reduced extremely.

Figure 1:
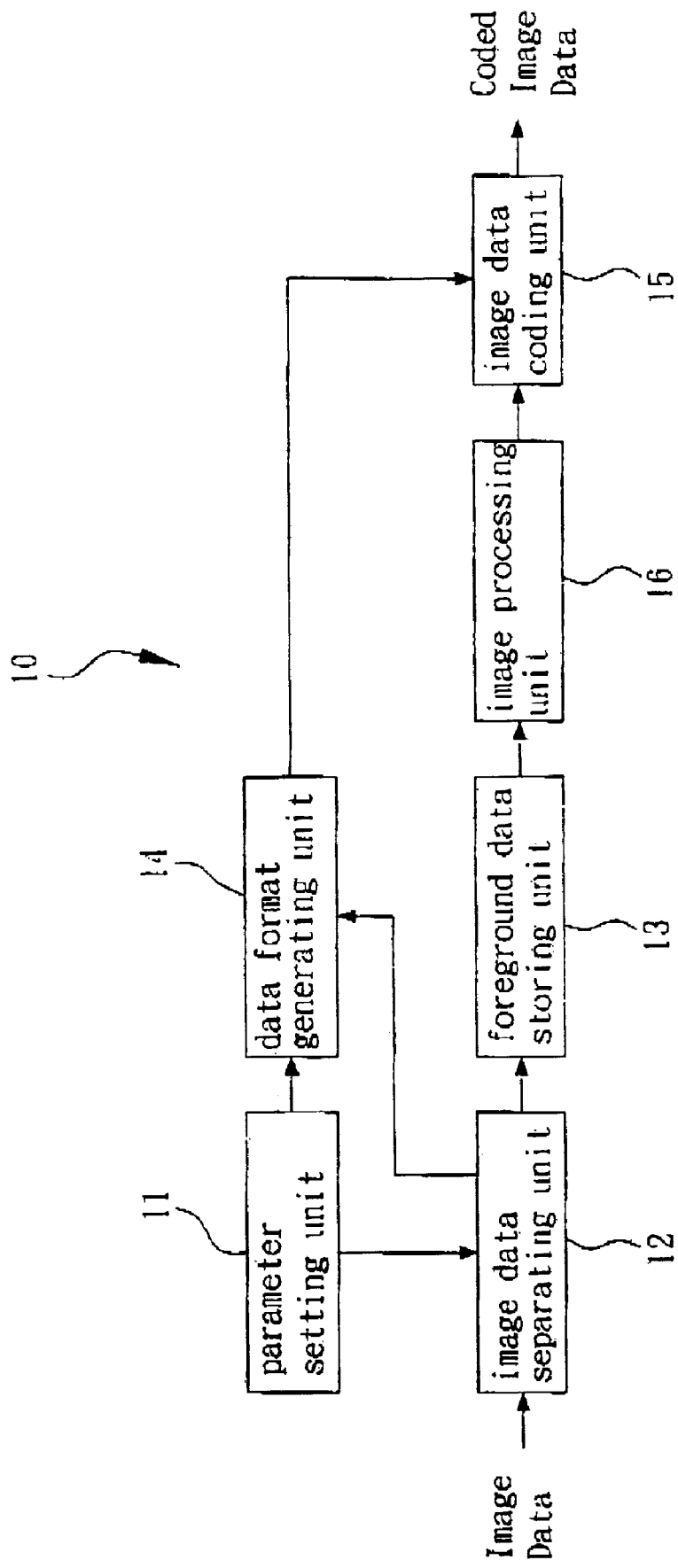
FIG. 1 is a block diagram schematically showing the coding unit of the image processing device according to the present invention.

FIG. 1 is a diagram showing the coding unit of the image processing device according to the present invention. As shown, the coding unit 10 of the image processing device comprises a parameter setting unit 11, an image data separating unit 12, a foreground data storing unit 13, a data format generating unit 14, an image processing unit 16 and an image data coding unit 15.

The parameter setting unit 11 allows user to set up (e.g. to predetermine) the background data of the image data needed to be coded. The image data separating unit 12 is responsible for separating the pixels that is not belong to the background data and storing them in the foreground data storing unit 13. The image data separating unit 12 processes the image data in a pixel-by-pixel and row-by-row manner. Each pixel of the image data is compared with the predetermined background data by the image data separating unit 12. If the pixel being compared does not fit within the background data, then that pixel will be considered as the foreground data. The information of the pixels from the first foreground data to the last foreground data for each row of the image data are then stored in the foreground data storing unit 13. In the mean time, the locations of the first foreground data and the last foreground data for each row are also recorded. The image data separating unit 12 also outputs the information about the size and format type of the image data to the data format generating unit 14.

The data format generating unit 14 generates the file header of the coded image file. The file header contains the information about the background data, the height and width of the image data, and so on. The image data coding unit 15 converts the foreground data stored in the foreground data storing unit 13 into blocks of data with predetermined size, and then codes these blocks of data so as to generate the coded data packets. And then, these data packets are combined with the file header to generate the coded image file.

Moreover, the image data coding unit 15 further comprises a compressing unit (not shown in the figures) for compressing the foreground data of the data packets so as to reduce the size of the coded image file. Various data compression formats, such as GIF, JPG and PIC, can be used during the compressing process to obtain the best output. Finally, the compression format identification code will be added to the file header for decoding purpose.

Figure 2:
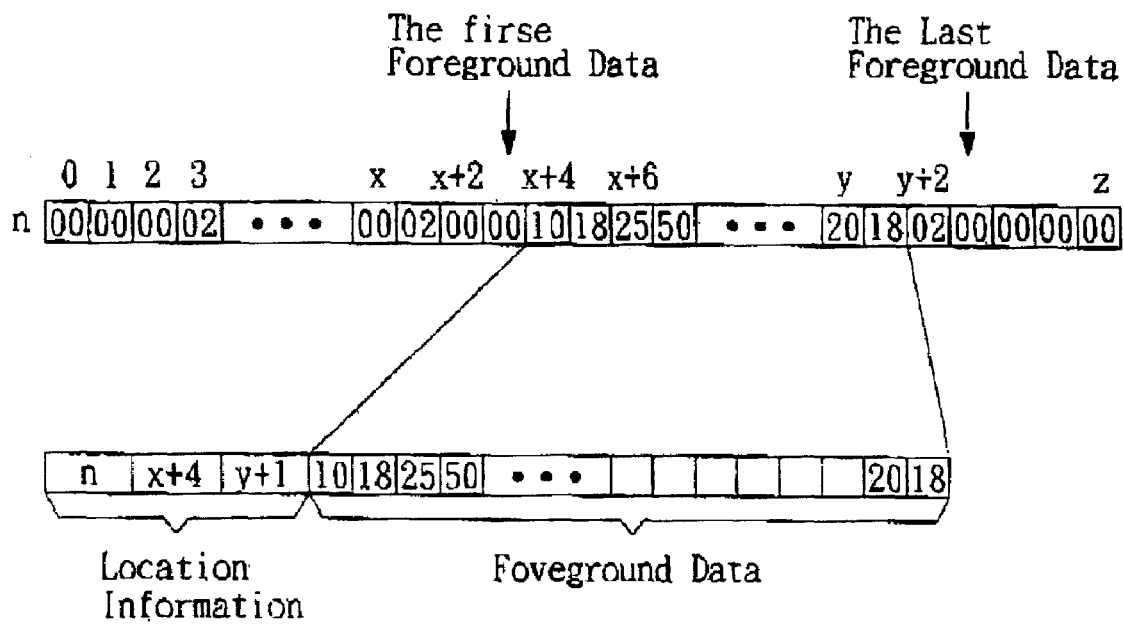
FIG. 2 is a diagram schematically showing that the image data separating unit of the present invention is separating the data in the $N^{th}$ row of the image data.

FIG. 2 is a diagram showing that the image data separating unit 12 of the present invention is separating the data in the $N^{th}$ row of an image data. As shown, the data in the $N^{th}$ row of the image data contain z pixels. Assuming that each pixel contains 8 bits of data, so each row of the image data needs z bytes memory space for storing. If the predetermined threshold value of the background data is set up to 05H and any pixel with a value greater than 05H will be defined as the foreground data, then, the first foreground data will be the $x+4^{th}$ pixel and the last foreground data will be the $y+1^{th}$ pixel. After being processed by the image data separating unit 12, the foreground data which is counted from the $x+4^{th}$ pixel to the $y+1^{th}$ pixel will be stored in the foreground data storing unit 13. In the mean time, the foreground data storing unit 13 also records the information about the locations of the pixels $x+4^{th}$ and $y+1^{th}$ as well as the length "$(y+1)-(x+4)+1$" of the foreground data. Therefore, after being processed by the image to data separating unit 12, the amount of the image data stored in the foreground data storing unit 13 will be significantly reduced. And, the data packets for each row of the image data will contain the information about the locations and length of the pixels of the foreground data. Since these data packets do not include the pixels that are belong to the background data, the amount of the image data stored in the foreground data storing unit 13 is therefore extremely reduced. Meanwhile, if the pixels of a row of the image data are all belong to the background data, then the entire row will be skipped without being stored by the foreground data storing unit 13.

The background data can be set up depending on various types of images. For example, the image can be monochrome or color. For a monochrome image, only one single background data needs to be set up. However, at least three parameters including red (R), green (G) and blue (B) will need to be set up for a color image. And the way to set up the parameters of the background data can be achieved by operating a user interface manually or by using an image analyzing software automatically.

It is notable that, although the embodiment described above deems to store and process all pixels between the first foreground data and the last foreground data, however, there is yet another way to further reduce the amount of data. A threshold quantity value "M" can be predetermined in advance. Such that, if any row of the image data contains more than "M" continuous pixels of non-foreground data (i.e. background data) between the first foreground data and the last foreground data, then that particular row will be divided into multiple sections. Therefore the aforementioned "M" continuous pixels of background data will not be stored into the foreground data storing unit 13 for coding. As a result, the amount of image data will be further reduced.

Although the data packet described above only contains the foreground data of one row, however, in another embodiment, the data packet of the present invention can also stores the data merged with a plurality of rows in a block format. When it happens, each data packet would contain the information about the start locations of the row and column of each block, and the width and height of the block. After the image data coding unit 15 converts the foreground data stored in the foreground data storing unit 13 into data packets, the file header will be added thereto. These data packets together with the file header are then output as a coded image file. Since the data stored in the foreground data storing unit 13 is only the foreground data, it is necessary, for decoding purpose in a later process, to combine the file header that contains the predetermined background data of the image data. Of course, the size of data packet can be further reduced by employing the data compressing process.

An image processing unit 16, which is optional in the present invention, can be added between the foreground data storing unit 13 and the image data coding unit 15. The image processing unit 16 is used for receiving the foreground data output from the foreground data storing unit 13 and further performing some image handling processes such as Image Smooth and Edge Enhance on the foreground data.

Moreover, the method and the device of the present invention can replace the background data directly without the assistance of additional image processing software. It will be achieved simply by replacing the information of the background data stored in the file header generated by the data format generating unit 14 with another predetermined background data information.

Figure 3:
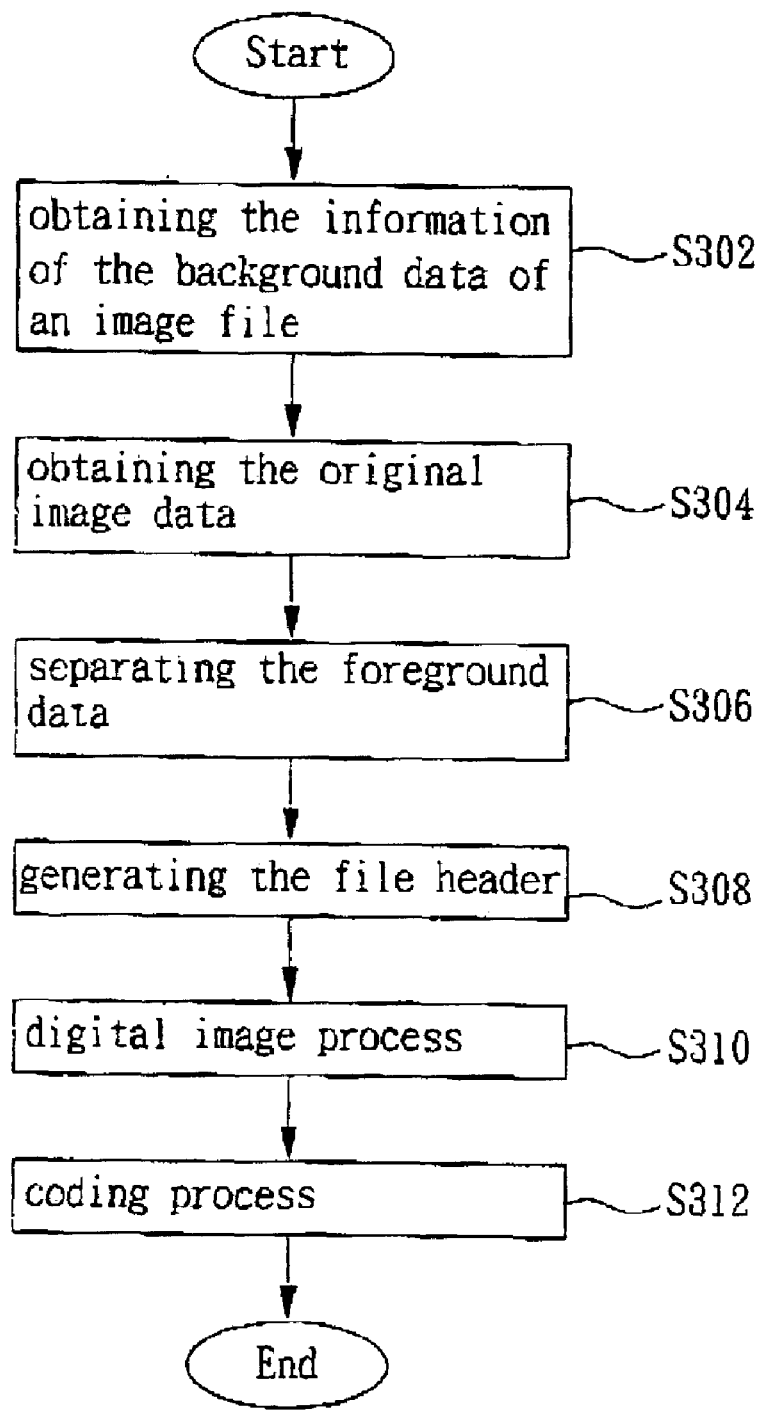
FIG. 3 is a diagram schematically showing the flow chart for the coding process according to the present invention.

FIG. 3 is a diagram showing the flow chart for the coding process according to the present invention. As shown, the process of the present invention comprises the following steps:

Step S302: obtaining (or predetermining) the information of the background data. The background data can be a fixed value or a value in a range. If the image is a color one, the information of the background data will contain the parameters of the colors of red (R), green (G) and blue (B).

Step S304: obtaining the original image data. Preferably, the image data should not be compressed. If it has been compressed, the foreground data and the background data will be unable to be separated directly.

Step S306: separating the foreground data. In this step, the foreground data and the background data of the original image data are separated. The steps of separation include: comparing each pixel of the original image data with the background data in a pixel-by-pixel and row-by-row manner, recoding the information of pixels between the first non-background data (i.e. the first foreground data) and the last non-background data (i.e. the last foreground data), recoding the location of the row in the image data, recoding the locations of the pixels of the first non-background data and the last non-background data in the row, and further generating a foreground data.

Step S308: generating the file header of the image data. The file header includes the image type, images width, image height, and background information being set up. The file header also includes the identification code describing the coding type.

Step S310: processing the image. This step includes receiving the foregoing foreground data, performing digital image processes and outputting a digitized foreground data.

Step S312: coding the image. This step includes storing the separated foreground data in data packet format. The data packet contains the information about the locations of the row and column corresponding to the foreground data, the size of the foreground data, and the foreground data itself. In one embodiment, the data packet stores only one row of the foreground data. However, in another embodiment, the data packet can also be designed to store the data of multiple rows in a block format. Additionally, the size of the data packet can be further reduced by a compressing process for compressing the foreground data contained in the data packet, and the compression format can be chosen from GIF, JPG, PIC and so on.

Figure 4:
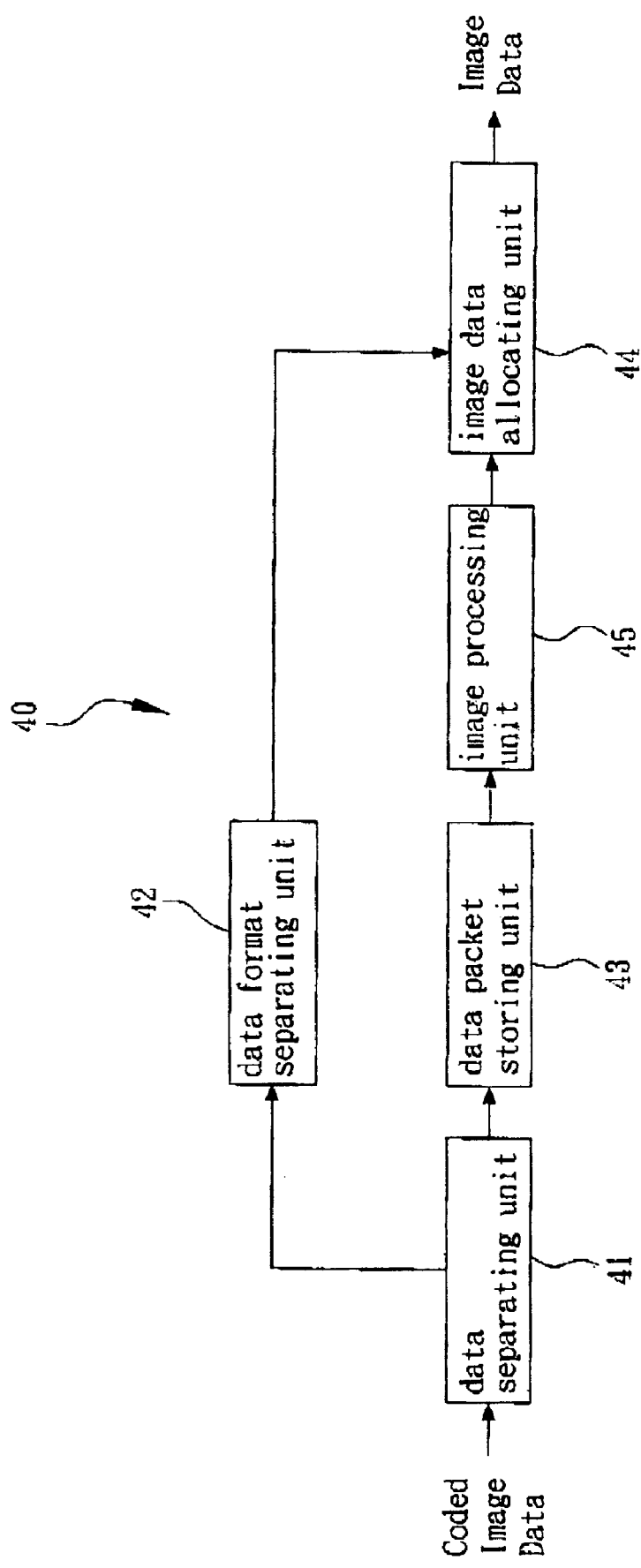
FIG. 4 is a block diagram schematically showing the decoding unit of the image processing device according to the present invention.

FIG. 4 is a diagram showing the decoding unit of the image processing device according to the present invention. As shown, the decoding unit 40 comprises a data separating unit 41, a data format separating unit 42, a data packet storing unit 43 and an image data allocating unit 44. The data separating unit 41 separates the file header from the data packets that is contained in the coded image file. The file header will be further outputted to the data format separating unit 42 and the data packets will be stored in the packet storing unit 43. The image data allocating unit 44 sets up the background data according to the background data that is generated by the data format separating unit 42 and further reads the foreground data stored in the data packet storing unit 43. Finally, the image data allocating unit 44 allocates the foreground data to the corresponding row and column locations in the image data according to the location information of the foreground data. Other locations (pixels) which are not written with foreground data will be considered as the background area and will be filled with background data. The location information in the data packets include the information about the starting and ending locations of the data, therefore, the image data allocating unit 44 is able to allocate the data to the correct location rapidly. If the compression format identification code in the file header shows the data has been compressed, the image data allocating unit 44 will decompress the foreground data of the data packet first to obtain the foreground data in every row and further allocate the foreground data to the correct row and column locations in the image data.

An image processing unit 45 can be optionally added between the data packet storing unit 43 and the image data allocating unit 44 for receiving the foreground data output from the packet storing unit 43 and further applying image processes, such as Image Smooth and Edge Enhance, to the foreground data.

Additionally, the method and device of the present invention can replace the background data directly without the assistance of any additional image processing software. It will be achieved simply by replacing the information about the background data with another predetermined background data information.

Figure 5:
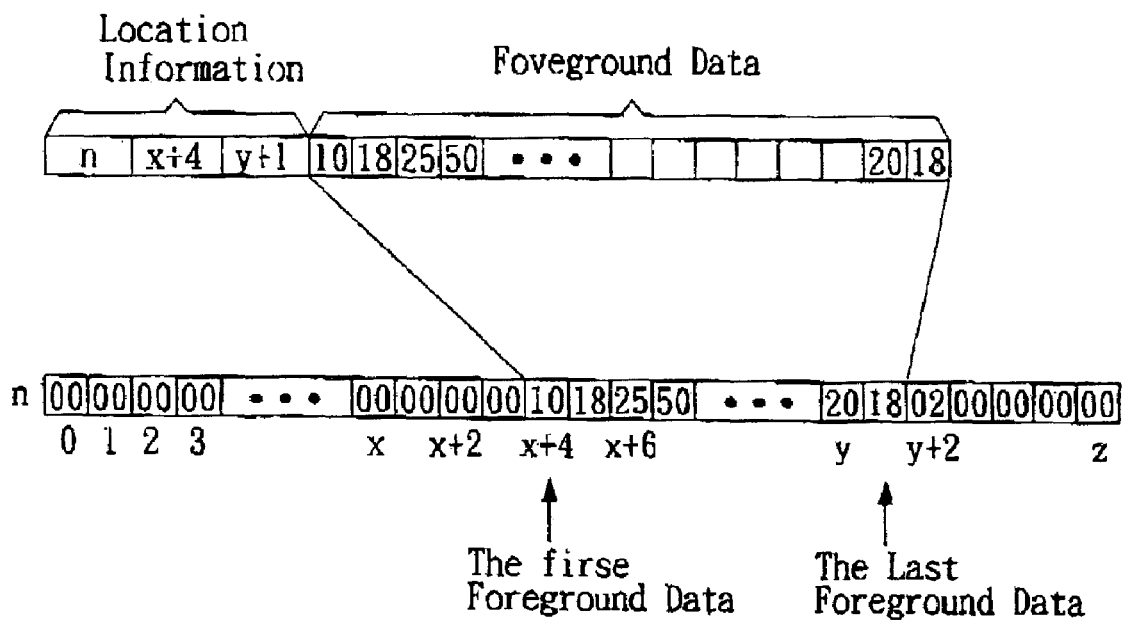
FIG. 5 is a diagram schematically showing that the image data allocating unit of the present invention is allocating the data in the $N^{th}$ row of the image data.

FIG. 5 is a diagram showing that the image data allocating unit 44 of the present invention is allocating the data in the $N^{th}$ row of image data. As shown, the image data allocating unit 44 firstly obtains the background data, the width z and the height of the image data according to the information contained in the file header. As seen, the data in the $N^{th}$ row of the image data contain z pixels. Assuming that each pixel contains 8 bits of data and the background data is set up to 00H. The image data allocating unit 44 sequentially reads each data packet and allocates the foreground data to the correct locations according to the location information contained in the data packet. For example in FIG. 5, the location information shows that the foreground data is starting from the $x+4^{th}$ pixel to the $y+1^{th}$ pixel of the $N^{th}$ row of the data, so, the image data allocating unit 44 can rapidly and correctly recover the image data just simply allocating the corresponding foreground data to the locations of the $x+4^{th}$ to the $y+1^{th}$ of the $N^{th}$ row accordingly. Pixels other than the foreground data will be filled with the background data so as to generate the decoded image data.

Figure 6:
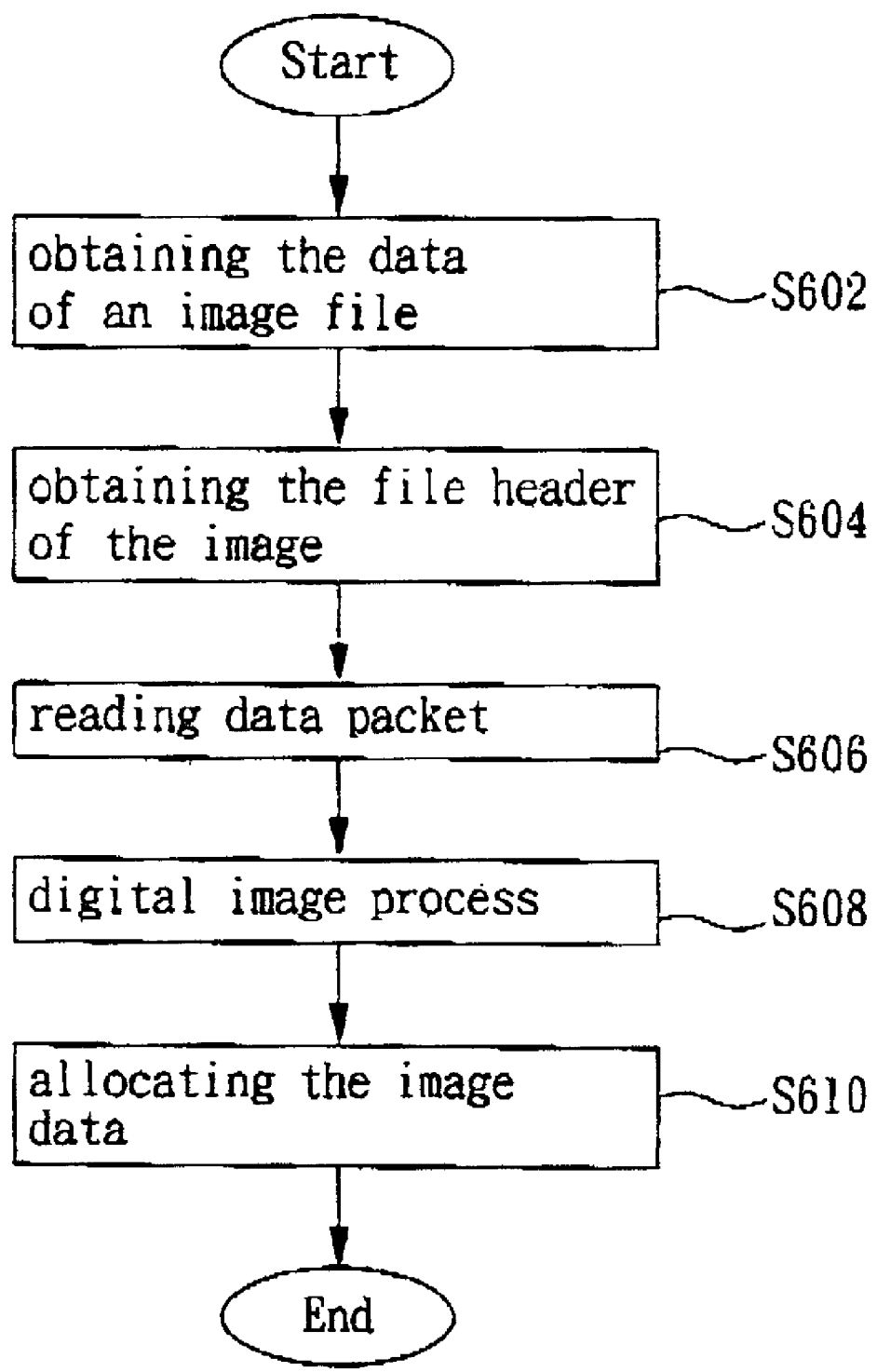
FIG. 6 is a diagram schematically showing the flow chart for the decoding process according to the present invention.

FIG. 6 is a diagram showing the flow chart for the decoding process according to the present invention. As shown, the process comprises the following steps:

Step S602: obtaining the data of a coded image file. The coded image is file is generated by the coding process of the present invention.

Step S604: obtaining the file header of the image data. The file header is separated from the image data. The file header includes the image type, image width, image height, and information of background data. The file header also includes the identification code describing the coding type.

Step S606: reading the data packets. In this step, the data packets will be separated from the obtained image data. Each data packet includes the information about the corresponding locations of row and column of the foreground data in the image data, and the information about the size of the foreground data, and the foreground data itself.

Step S608: processing the image. This step includes receiving the foregoing foreground data, performing digital processes and outputting a digitized foreground data.

Step S610: allocating the image data. In this step, the foreground data contained in the data packets will be written into the corresponding row and column locations of the image data according to the file header. The locations (pixels) which are not written with foreground data will be considered as the background area and will be filled with background data. If the compression format identification code in the file header shows the data has been compressed, the foreground data of the data packet will be decompressed first to obtain the foreground data in every row before performing the allocating process.

It is notable that, the background data in the step of S608 not only can be the background data stored in the file header, but also can be any color that is set up by using a user interface. With such method, the present invention will be able to rapidly change the background data.

The image processing method of the present invention can be employed in an image capture device built in a scanner, digital camera, or digital copy machine. Especially when scanning a monochrome image, the best quality and effect can be obtained easily by employing the image processing method disclosed in the present invention.

While the present invention has been shown and described with reference to a preferred embodiment thereof, and in terms of the illustrative drawings, it should be not considered as limited thereby. Various possible modification, omission, and alterations could be conceived of by one skilled in the art to the form and the content of any particular embodiment, without departing from the scope and the sprit of the present invention.

What is claimed is:

1. A method for processing digital image data, comprising steps of:
    obtaining a background data;
    separating a foreground data from the digital image data according to the background data;
    generating a header according to the digital image data, said header comprising the background data and an information corresponding to the digital image data; and
    coding the foreground data into at least one data packet and combining the header with the data packet to generate a coded image file;
    wherein the information comprise a starting location and a size of the foreground data corresponding to the digital image data.

2. The method of claim 1 further comprising processing the separated foreground data and hereby outputting the foreground data that has been processed.

3. The method of claim 1, wherein the background data of the header is replaced by a predetermined background data.

4. The method of claim 1, wherein the information comprises a starting and an ending locations of the foreground data corresponding to the digital image data.

5. The method of claim 1 further comprising a step of compressing the foreground data, wherein the header comprises a compression format identification code.

6. The method of claim 1, wherein the header further comprises a coding format identification code.

7. A device for processing digital image, comprising:
    a parameter setting unit for providing a background data;
    an image data separating unit for separating an image data according to the background data and generating at least one foreground data;
    a foreground data storing unit for storing the foreground data;
    a data format generating unit for generating a header, the header comprising the background data and an information of the image data; and
    a coding unit for converting the foreground data into at least one data packet and combining the header with the data packet to generate a coded image file;
    wherein the foreground data storing unit further store a starting and an ending locations of the foreground data.

8. The device of claim 7, further comprising an image processing unit which is furnished between the foreground data storing unit and the coding unit for processing the foreground data.

9. The device of claim 7, wherein the background data of the header is replaced by a predetermined background data.

10. The device of claim 7, wherein the coding unit comprises a compressing unit for compressing the foreground data.

11. The device of claim 10, wherein the header further comprises a compression format identification code.

12. The device of claim 7, wherein the header further comprises a coding format identification code.

* * * * *